United States Patent Office 3,523,973
Patented Aug. 11, 1970

3,523,973
DIAMINE PREPARATION
Phillip W. Evans, Pensacola, Fla., assignor to Monsanto Company, St. Louis, Mo., a corporation of Delaware
No Drawing. Filed Nov. 27, 1967, Ser. No. 685,953
Int. Cl. C07c 85/00
U. S. Cl. 260—583                                6 Claims

ABSTRACT OF THE DISCLOSURE

Alkylenediamine is prepared by heating under pressure bisalkylenetriamine, hydrogen and ammonia in the presence of a suitable catalyst.

BACKGROUND OF THE INVENTION

The present invention relates generally to a method for the preparation of alkylenediamine and more particularly to a method for the preparation of hexamethylene diamine.

Hexamethylene diamine is an important intermediate for the synthesis of polyamides and polyester amides, for example polyhexamethylene adipamide (Nylon 66), and its preparation has been the subject of many investigations. A successful and economical method for commercial preparation of substantially pure hexamethylene diamine is by continuous catalytic hydrogenation of adiponitrile in the presence of ammonia and a suitable catalyst, such as a nickel or cobalt catalyst, followed by purification of the hydrogenation product thus obtained (crude hexamethylene diamine) to remove various low and high boiling impurities. Conventionally, the purification is accomplished by passing crude hexamethylene diamine through a series of distillation stills. Efforts have been made in the past to improve the overall economics of the process. Thus, for example, the hydrogenation conditions have been varied; improved catalysts have been developed or suggested; high purity adiponitrile feed has been used; and water has been introduced into the hydrogenation reaction. Although each of these variations has resulted in a noticeable improvement in the process, further improvement is desirable, particularly since large amounts of hexamethylene diamine are presently required in industry for the manufacture of synthetic fibers.

SUMMARY OF THE INVENTION

According to the present invention a novel process is provided for the preparation of alkylenediamine of the general formula $NH_2—(CH_2)_n—NH_2$, wherein $n$ is an integer from 2 to 10, which comprises heating under pressure bisalkylenetriamine of the general formula

$$NH_2—(CH_2)_n—NH—(CH_2)_n—NH_2$$

with hydrogen in the presence of ammonia and a suitable catalyst, such as a cobalt or nickel hydrogenation catalyst. The process provides a new route for the synthesis of hexamethylene diamine; a new use for bishexamethylene triamine; and an improvement in the process for the preparation of hexamethylene diamine by the catalytic hydrogenation of adiponitrile.

Surprising, the process of the present invention can be carried out employing reaction conditions corresponding to those used in the preparation of hexamethylene diamine by the well-known catalytic hydrogenation of adiponitrile process. Such conditions as well as suitable catalysts and process equipment are fully described in the literature, for example, in U.S. Pat. Nos. 3,056,837; 3,272,866; and 3,272,867. Suitable conditions for carrying out the process include temperatures ranging from 25° C. to 200° C. and pressures ranging from 25 to 10,000 pounds per square inch (p.s.i.) or higher. Usually, the lowest temperature and pressure at which hydrogen is absorbed at a reasonably rapid rate are employed, for example, a temperature between about 120° C. and 170° C. and a pressure between about 4,000 and 6,000 pounds per square inch. For best results the mole ratio of feed materials should range from 25–30 to 1, ammonia to bisalkylenetriamine; and 35–43 to 1, hydrogen to bisalkylenetriamine. The feed materials may be passed through a catalyst chamber positioned within a reaction vessel. According to this arrangement the feed materials enter the vessel at the lower portion thereof and product is taken off overhead. The ammonia and bisalkylenetriamine may be co-mingled at first and the mixture allowed to mix with a stream of hydrogen en route to the catalyst chamber or separate streams of the feed material may be allowed to converge in any suitable manner. Moreover, if desired, variation which may be applied to the catalytic hydrogenation of adiponitrile process may also be applied to the process of the present invention, e.g. a small amount of water, up to 10%, may be introduced into the reaction vessel.

DESCRIPTION OF THE PREFERRED EMBODIMENT

According to the preferred embodiment of the invention, the process is tied in with and is an integral part of the above-described catalytic hydrogenation of adiponitrile process wherein impurities formed during the hydrogenation are subsequently removed from the product by distillation. Bishexamethylene triamine is such an impurity which has heretofore been considered a waste material. Now in accordance with the present invention bishexamethylene triamine is removed from crude hexamethylene diamine and subjected to adiponitrile hydrogenation conditions whereby a portion thereof is converted to additional hexamethylene diamine. In this manner the overall yield of hexamethylene diamine is increased, or stated differently, the amount of impurities resulting from the synthesis of hexamethylene diamine is reduced. Bishexamethylene triamine recovered during purification of crude hexamethylene diamine may be passed through a separate reactor. Optimally, however, the recovered bishexamethylene triamine is passed through the same reactor employed in hydrogenating adiponitrile. Bishexamethylene triamine can be introduced into the adiponitrile hydrogenation reactor either as a separate stream or preferably it can be combined with the ammonia-adiponitrile feed stream. When bishexamethylene triamine is combined with the ammonia-adiponitrile feed stream, the amount of reactants introduced into the reactor should be adjusted to take into account the bishexamethylene triamine present. This can be accomplished by increasing the amount of ammonia and hydrogen introduced or by reducing the amount of adiponitrile introduced.

Bishexamethylene triamine used in the examples to illustrate the invention was removed by distillation as a tails stream in the purification of crude hexamethylene diamine. Relatively pure bishexamethylene triamine was then recovered from this tails stream by additional distillation.

Example 1

Sintered cobalt catalyst, cylindrical in shape, was vertically mounted in a stainless steel reactor. A mixture of about 450 pounds ammonia and 112 pounds adiponitrile was metered under 4500 p.s.i.g. pressure to a mixer, where hydrogen, also under 4500 p.s.i.g. pressure, was blended therewith to provide an adiponitrile feed containing 70 cubic feet of hydrogen per pound of adiponitrile. The blend was preheated and passed continuously into the reactor and upwards through the catalyst. The catalyst temperature was varied between 125° C. and 150° C. to maintain a small, constant adiponitrile concentration in the reactor effluent stream (product). After cooling, excess hydrogen was separated from the product, the pressure reduced to atmospheric pressure, and excess ammonia separated from the product. Samples of this crude hexamethylene diamine were taken every four hours during the run, and laboratory analysis performed to determine the content thereof. The run, which lasted 129.5 hours, was carried out in three stages. During the first stage (28.2 hours) the feed rate of the blend was such that adiponitrile was being fed at the rate of the 3.5 pounds per hour corresponding to an adiponitrile space velocity of about 1.4 per hour; analysis showed the bishexamethylene triamine content of product was 0.71±0.12%. During the second stage (13.8 hours) the conditions were the same as in stage 1 except 2.92% bishexamethylene triamine was added to the feed; analysis showed the bishexamethylene triamine content of the product now was 3.26±0.37%. During the third stage (87.5 hours) conditions were the same as in stage 1; analysis now showed the bishexamethylene triamine content of the product was 1.53±0.19%, a gradual increase in bishexamethylene triamine formation is normal during a synthesis run. Approximately 20% of the bishexamethylene triamine added in stage 2 was converted to hexamethylene diamine. Analysis in each instance showed that the only component of the crude hexamethylene diamine which changed detectably was bishexamethylene triamine.

This example shows that hexamethylene diamine is prepared by subjecting bishexamethylene triamine to reaction conditions corresponding to the hydrogenation conditions used in converting adiponitrile to hexamethylene diamine. Moreover, the example illustrates a technique whereby an increase in hexamethylene diamine yield can be obtained in the catalytic hydrogenation of adiponitrile.

Example 2

Under the reaction conditions specified in Example 1, bisalkylenetriamine structures are broken at the center nitrogen atom. Hydrogen then adds to the segment having two amino groups and an amino group adds to the other segment. However, merely heating bisalkylenetriamines has no effect upon their structures, for example, bishexamethylene triamine can be heated at temperatures up to about 200° C. for several hours in the absence of air at reduced pressures with negligible decomposition. To illustrate the thermal stability of bishexamethylene triamine, the following experiment was performed:

A distillation flask was charged with 75 pounds of dilute, crude bishexamethylene triamine which contained 12 pounds of bishexamethylene triamine. The material was heated to over 200° C. to remove the low boiling fractions. The high boiling fraction was removed from the flask and the flask was once again charged with 75 pounds of the crude and the crude heated to separate fractions as before. This procedure was repeated a third time. The high boiling fractions were then collected and composited. Analysis showed that the composited high boiling fractions contained at least 35.5 pounds of bishexamethylene triamine, indicating essentially no decomposition of bishexamethylene triamine had occurred. Twenty pounds of the fraction containing concentrated bishexamethylene triamine was subjected to further heating. When the temperature reached about 300° C., The entire mass solidified, indicating thermal decomposition.

Thus far the invention has found its most useful application as an improvement in the continuous process for the preparation of hexamethylene diamine by the catalytic hydrogenation of adiponitrile. However, the process of the invention can be carried out as a batch or continuous process employing any bisalkylenetriamine of the general formula $NH_2—(CH_2)_n—NH—(CH_2)_n—NH_2$, or mixture thereof, to prepare the corresponding alkylenediamine of the formula $NH_2—(CH_2)_n—NH_2$.

What is claimed is:

1. A process for the preparation of alkylenediamine of the general formula $NH_2—(CH_2)_n—NH_2$ wherein $n$ is an integer from 2 to 10 which comprises heating at temperatures between 25° C. and 200° C. and at pressures between 25 and 10,00° p.s.i. hydrogen, ammonia and triamine of the general formula $$NH_2—(CH_2)_n—NH—(CH_2)—NH_2$$

in the presence of a hydrogenation catalyst, wherein the mole ratio of hydrogen to triamine is from 35–43 to 1 and the mole ratio of ammonia to triamine is from 25–30 to 1.

2. The process of claim 1 wherein the alkylenediamine is hexamethylenediamine and the triamine is bishexamethylenetriamine.

3. The process of claim 1 wherein the catalyst is a nickel or cobalt catalyst.

4. In the continuous process for the preparation of substantially pure hexamethylenediamine by the catalytic hydrogenation of adiponitrile in the presence of ammonia and a hydrogenation catalyst at temperatures between 25° C. and 200° C. and pressures between 25 and 10,000 p.s.i. of the type wherein adiponitrile is fed into a pass-through reactor along with sufficient ammonia and hydrogen to provide therein a mole ratio of hydrogen to triamine of from 35–43 to 1 and wherein the resulting crude hexamethylenediamine hydrogenation product is withdrawn from the reactor and purified by passing the product through a series of distillation stills to separate bishexamethylenetriamine and other impurities from the product, the improvement of recovering the separated bishexamethylenetriamine and recycling sufficient amounts thereof to provide in the reactor a mole ratio of ammonia to the triamine of from 25–30 to 1.

5. The process of claim 4 wherein the temperature is between 120° C. and 170° C. and the pressure between 4,000 and 6,000 p.s.i.

6. The process of claim 4 wherein the catalyst is a nickel or cobalt catalyst.

References Cited

UNITED STATES PATENTS 3,418,375    12/1968    Schmitt et al. _____ 260—583

CHARLES B. PARKER, Primary Examiner

R. L. RAYMOND, Assistant Examiner